United States Patent Office 3,075,974
Patented Jan. 29, 1963

3,075,974
3-(2-(4 - MORPHOLINO)ETHYL)-1-(5-NITROFURFU-RYLIDENAMINO)HYDANTOIN AND ACID ADDITION SALTS THEREOF
Julian Getz Michels, Norwich, N.Y., assignor to The Norwich Pharmacal Company, a corporation of New York
No Drawing. Filed Dec. 27, 1960, Ser. No. 78,331
2 Claims. (Cl. 260—240)

This invention relates to a new chemical compound and acid addition salts thereof which possess a high order of antibacterial activity and which exhibit resistance to metabolic destruction. The compound may be described as a 3-[2-(4 - morpholino)ethyl] - 1 - (5-nitrofurfurylideneamino) hydantoin. The compound and its acid addition salts are represented by the formula:

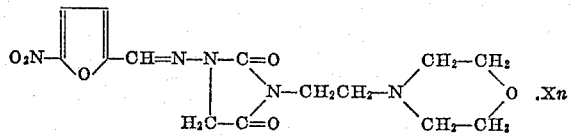

wherein

X represents an acid; and
n represent a number from 0–1.

This new compound is a very effective systemic chemotherapeutic agent when administered per os to animals lethally infected with highly pathogenic bacteria; for instance, *Staphylococcus aureus*. Death is prevented in 100% of mice lethally infected with *S. aureus* by the oral administration, one-half hour post infection, of a single dose of 200 mg./kg. of this new compound. Mice similarly infected but not treated with this compound suffer a mortality of 95%. The extremely high effectiveness of this compound in combatting *S. aureus* plus its relatively low toxicity renders this compound a very useful chemotherapeutic agent.

It has also been found that this new compound is further distinguished by the high order of coccidiostatic activity which it exhibits in combatting *Eimeria tenella* infections in poultry when administered in far less than toxic amounts. It may be used prophylactically in the prevention of coccidiosis or as a therapeutic treatment of established disease due to that organism. In the therapeutic treatment of coccidiosis concentrations of up to about 0.022% by weight, based on the weight of poultry rations, may be used to advantage. When employed prophylactically, a lesser amount in the range of 0.008 to about 0.011% by weight is normally sufficient.

The compound of this invention is remarkably resistant to metabolic processes which frequently cause substantial breakdown and loss of available active agent. When administered to rats, in excess of 10% of the administered dose appears in the urine. This amount renders the urine antibacterial to organisms such as *Escherichia coli* and *S. aureus*, frequently encountered and often troublesome in urinary tract infections. The ability possessed by this compound to resist metabolic influences and to provide urinary antibacterial concentrations makes it a valuable urinary tract chemotherapeutic.

This new compound is relatively non toxic. In mice the LD$_{50}$ is about 600 mg./kg. Poultry consuming feed containing 0.022% by weight of this new compound show no evidence of toxicity.

The new compound of this invntion is not limited to the oral route of administration for chemotherapeutic purposes. The acid addition salts particularly those formed with physiologically tolerable acids, such as hydrochloric, sulfuric, and phosphoric, are readily soluble in aqueous media. These salts because of their solubility may be readily adapted to the parenteral route of administration, for instance, intravenous, by dissolving them in physiologically acceptable menstrua such as isotonic saline or glucose solution.

The compounding and formulating of 3-[2-(4-morpholino)ethyl]-1-(5 - nitrofurfurylideneamino)hydantoin in dosage forms such as tablets, suspensions, elixirs, syrups, lozenges and the like is readily carried out using those excipients and adjuvants commonly employed in pharmaceutical practice.

The preparation of this new compound and its acid addition salts may be readily carried out in a number of ways. The method which is currently preferred consists in reacting a solution comprising a salt of a 1-aralkylideneaminohydantoin in an organic solvent with morpholinoethyl chloride to produce a 3-morpholinoethyl-1-aralkylideneaminohydantoin; followed by treatment of this product to release the 3-morpholinoethyl-1-aminohydantoin which is then condensed with 5-nitrofurfural or a derivative thereof capable of supplying it under the reaction conditions.

More specifically, a solution of sodium 1-benzylideneaminohydantoin in dimethylformamide reacts readily under the influence of heat with morpholinoethyl chloride to yield 3-morpholinoethyl-1-benzylideneaminohydantoin. Removal of the dimethylformamide followed by steam distillation of the residue in the presence of an aqueous mineral acid, i.e., hydrochloric, to remove the benzaldehyde and to release the 3-morpholinoethyl-1-aminohydantoin for reaction with 5-nitrofurfural, produces 3-[2-(4-morpholino)ethyl]-1-(5 - nitrofurfurylideneamino)hydantoin in excellent yield.

In order that this invention may be more readily available to those skilled in the art, the following illustrative example is hereby submitted.

EXAMPLE I

3-[2-(4-Morpholino)Ethyl]-1-(5-Nitrofurfurylideneamino)Hydantoin Hydrochloride

A solution of 23.5 g. of 1-benzylideneaminohydantoin in 600 cc. of dimethylformamide is treated with 5.1 g. of sodium hydride in mineral oil. When the reaction is complete, 17.3 g. of morpholinoethyl chloride is added and the mixture heated at 110–115° C. The dimethylformamide is distilled off under reduced pressure and the residue steam distilled in the presence of hydrochloric acid. When no more benzaldehyde is evolved, a solution of 20 g. of 5-nitro-furfural in alcohol is added. The hydrochloride salt of 3-[2-(4morpholino)ethyl]-1-(5-nitrofurfurylideneamino)hydantoin precipitates and is filtered (31.1 g., 69%). This is recrystallized from water using charcoal to clarify. Further recrystallization to remove any impurity is conducted from aqueous acetone. There is obtained 15.6 g. of purified product having a melting point of 225° C. with decomposition. The free base is prepared by treating an aqueous solution of the salt with sodium bicarbonate.

In lieu of 5-nitrofurfural, 5-nitrofurfural diacetate may be used.

What is claimed is:

1. A compound having chemotherapeutic activity and resistance to metabolic destruction selected from the group consisting of a base and pharmaceutically acceptable acid addition salts of the formula:

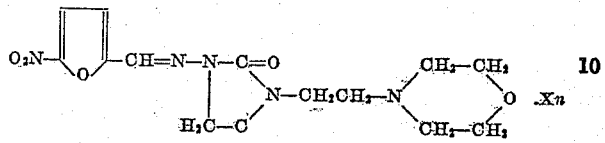

in which

X represents a mineral acid; and
n represents a number from 0–1.

2. 3-[2-(4-morpholino)ethyl]-1-(5 - nitrofurfurylidene-amino)hydantoin hydrochloride represented by the formula:

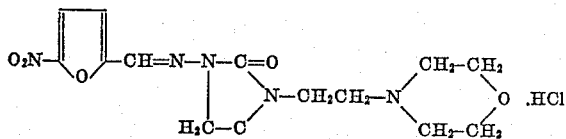

References Cited in the file of this patent

UNITED STATES PATENTS

| | | |
|---|---|---|
| 2,610,181 | Hayes | Sept. 9, 1952 |
| 2,802,002 | Gever | Aug. 6, 1957 |
| 2,990,402 | Jack et al. | June 27, 1961 |

UNITED STATES PATENT OFFICE
CERTIFICATE OF CORRECTION

Patent No. 3,075,974            January 29, 1963

Julian Getz Michels

It is hereby certified that error appears in the above numbered patent requiring correction and that the said Letters Patent should read as corrected below.

Column 2, line 3, for "invntion" read -- invention --; line 57, for (4morpholino) read -- (4-morpholino) --; column 3, lines 8 to 13, the formula should appear as shown below instead of as in the patent:

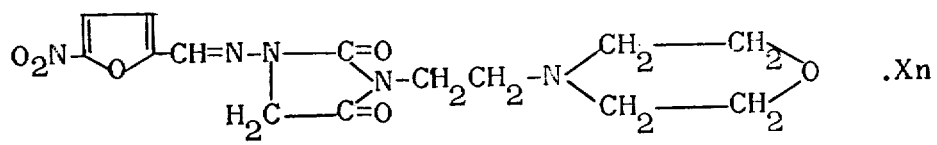

column 4, lines 5 to 9, the forumla should appear as shown below instead of as in the patent:

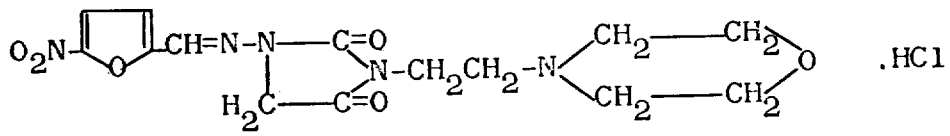

Signed and sealed this 27th day of August 1963.

(SEAL)
Attest:

ERNEST W. SWIDER
Attesting Officer

DAVID L. LADD
Commissioner of Patents